April 23, 1963 K. W. JAY 3,086,581

FUEL PUMPING SYSTEMS FOR AIRCRAFT ENGINES

Filed Jan. 8, 1960

INVENTOR
KENNETH WILLIAM JAY

BY~ Maybee & Legris
ATTORNEYS

United States Patent Office 3,086,581
Patented Apr. 23, 1963

3,086,581
FUEL PUMPING SYSTEMS FOR AIRCRAFT ENGINES
Kenneth William Jay, Toronto, Ontario, Canada, assignor to Orenda Engines Limited, Malton, Ontario, Canada, a corporation
Filed Jan. 8, 1960, Ser. No. 1,304
5 Claims. (Cl. 158—36.4)

This invention relates to fuel pumping systems for engines and in particular is concerned with fuel pumping systems for gas turbine aircraft engines. A major problem to be overcome in designing a fuel pumping system for a gas turbine aircraft engine is to provide a system which is efficient over a wide range of fuel flows.

Thus, when the aircraft is cruising at high altitude without afterburner operation, the engine requires a low rate of fuel flow as compared with the fuel flow required for high speed runs at low altitude with afterburner operation. If gear type fuel pumps were used which always delivered a high flow then, for much of the time, a high by-pass fuel flow would be needed and this would add considerable heat to the fuel. On the other hand, if air turbine pumps were used this would be inefficient since it is difficult to select a turbine pump of suitable size which will show good efficiency over the entire range of fuel flow required.

An object of the invention is to provide a fuel pumping system having high efficiency over a wide range of fuel flows, and including two fuel pump means, one of which is only brought into operation intermittently, the system also including means to prevent operation of said one fuel pump means if there is no fuel pressure in the system.

Figure 1:
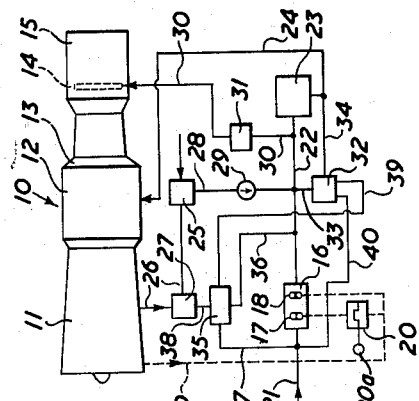
Figure 2:
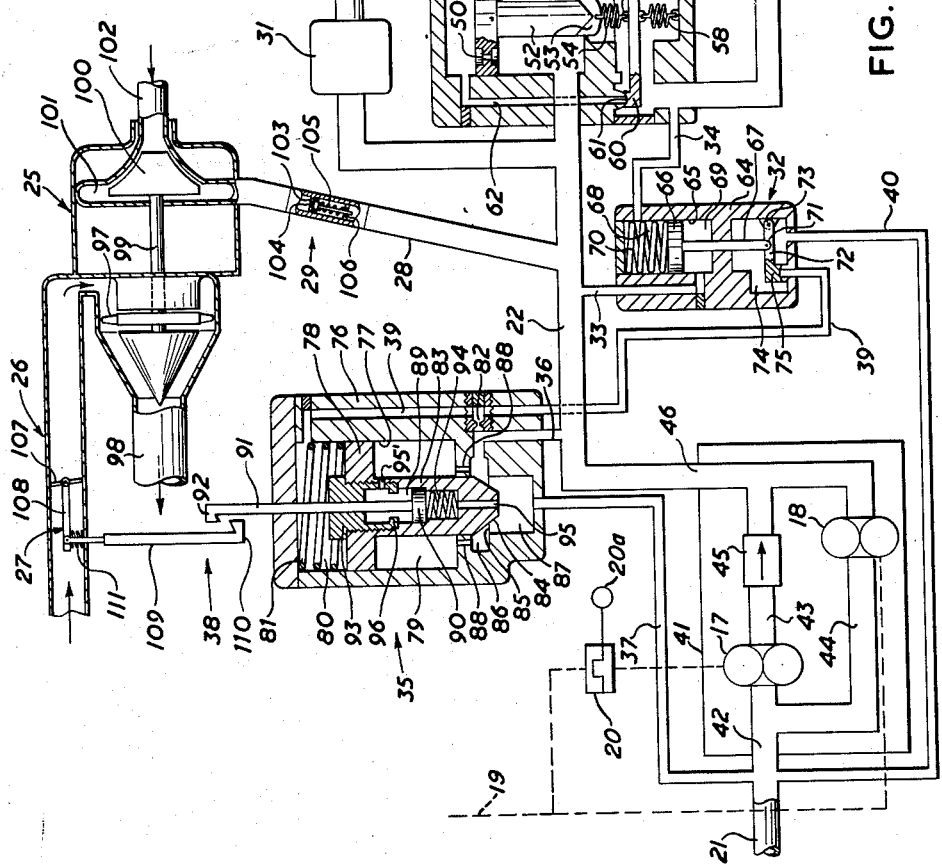

The invention will now be described by way of example with reference to the accompanying drawings, in which:

FIGURE 1 shows, in diagrammatic form, a gas turbine aircraft engine in combination with a fuel pumping system according to the invention, and FIGURE 2 shows, in detail, units of the fuel pumping system shown in FIGURE 1.

Referring now to FIGURE 1, a gas turbine engine is indicated generally at 10 and includes a compressor portion 11, a combustion chamber 12, a turbine portion 13 and an afterburner 14 within a jet pipe 15. First fuel pump means is indicated at 16 and comprises two gear pumps 17 and 18 which are driven from the engine as indicated by the chain dotted line 19. The pump 18 is continuously driven from the engine but the pump 17 is driven through a disconnectable clutch 20, controlled by a speed-responsive switch 20a. The first fuel pump means draws fuel from a fuel inlet conduit 21 and delivers the fuel to a fuel transfer conduit 22.

The fuel flows along the transfer conduit to a metering valve 23 and thence along a fuel delivery conduit 24 to the combustion chamber 12. Second pump means, comprising an air turbine pump, is indicated at 25 and is operated by air bled from the compressor 11 along a conduit 26; a valve 27 is inserted in the conduit 26 and constitutes control means for the second pump means 25. The second pump means 25 delivers fuel into the transfer conduit 22 by means of a conduit 28 having a non-return valve 29 therein. A pipe 30 leads from the transfer conduit 22 to the afterburner 14 and is provided with a control 31 to control the amount of fuel flowing to the afterburner.

Connected across between the transfer conduit 22 and the fuel delivery conduit 24 is sensing means indicated at 32; the sensing means is connected to the transfer conduit 22 by the conduit 33 and is connected to the fuel delivery conduit 24 by a conduit 34. A variable by-pass valve assembly 35 is connected between the transfer conduit 22 and the fuel inlet conduit 21 by means of conduits 36 and 37 respectively. The by-pass valve assembly 35 is operatively connected to the control means 27 by a linkage 38 which will hereinafter be more fully described. Conduits 39 and 40 extend between the by-pass valve 35 and the sensing means 32, and between the sensing means 32 and the fuel inlet conduit 21 respectively.

Referring now to FIGURE 2, the construction of the various components shown in FIGURE 1 and the method of operation of the system will now be described.

As mentioned above the first pump means 16 comprises two gear pumps 17 and 18. These pumps are contained in a casing 41 having an inlet 42 which divides, within the casing, into two ducts 43 and 44. The pump 17 works in the duct 43 and delivers through a check valve 45 to the outlet of the casing 46 which is connected to the transfer conduit 22. The pump 18 works in the conduit 44 and draws fuel from the inlet 42 and delivers it directly to the outlet 46. The fuel delivered from the outlet 46 passes along fuel transfer conduit 22 to the metering valve 23.

The metering valve comprises a casing 47 having a cylindrical bore 48 formed therein. A piston 49 is slidable in the bore 48 and includes a restriction 50 to place the sides of the piston in communication with one another. Metering orifice 51 is formed in the lower wall of the bore 48 and the piston 49 carries a valve member 52 which cooperates with the orifice 51. The valve member 52 also includes a lobe 53 to which is connected one end of a spring 54. Fuel enters the bore 48 beneath the piston 49 from the fuel transfer conduit 22 and flows through the orifice 51 as controlled by the valve member 52.

The metering valve also includes a lever 55 pivoted at 56 and connected at 57 to the other end of the spring 54. A further spring 58 is connected between the lever and the lower portion of the casing 47. One end of the lever 55 is connected to an aneroid capsule 59 and the other end of the lever is formed with a valve member 60 adapted to open and close an orifice 61. The orifice 61 is formed at the lower end of a passage 62 formed in the wall of the casing 47; the passage communicates with the bore 48 above the piston 49. The capsule 59 is exposed to atmospheric pressure through a pipe 63 and the pivot 56 is made fluid-tight to prevent fuel escaping into the chamber containing the capsule and thus to atmosphere. It will be seen that the fuel delivery conduit 24 enters the casing 47 through the lower wall thereof so that fuel may flow from the fuel transfer conduit 22, through the orifice 51 as controlled by the valve member 52, and thence along the fuel delivery conduit 24.

Turning now to the sensing means 32, this is housed in a casing 64 and includes a cylindrical bore 65 and a piston 66 slidable in the bore. A piston rod 67 is secured to the piston 66 and passes through the lower wall of the bore 65. The piston 66 divides the bore 65 into first and second chambers 68 and 69 respectively and the chamber 68 contains a spring 70 which biases the piston 66 to its lower position. The chamber 68 is exposed to the pressure in the fuel delivery conduit through the conduit 34 and the chamber 69 is exposed to the pressure in the fuel transfer conduit through the conduit 33.

At its lower end, the piston rod 67 is pivotally connected at 71 to a lever 72 pivoted to the casing 64 at 73. The lever 72 operates in a chamber 74 into which open the conduits 39 and 40. The lever 72 carries a valve member 75 which provides a variable bleed at the end of the conduit 39 and the piston rod 67 comprises an operative connection between the variable bleed and the sensing means.

Referring now to the by-pass valve assembly 35, this comprises a casing 76 having a cylindrical bore 77 formed therein. A piston 78 is slidable in the bore and divides the bore into a first chamber 79 and a second chamber 80. A spring 81 is situated in the chamber 80 and tends to push the piston 78 to its lower position. The conduit 39 is continued in the casing 76 and opens into the chamber 80; moreover, the conduit 39 communicates with the conduit 36 through a restriction 82. The piston 78 carries a depending spigot 83 which at its lower end forms a chamfered valve member 84 to co-operate with an orifice 85 in the casing 76; the orifice 85 and valve member 84 constitute the by-pass valve proper. Fuel is able to flow from the fuel transfer conduit 22, through the conduit 36, a gallery 86, the orifice 85, a chamber 87 and the conduit 37 back to the fuel inlet conduit 21. Ports 88 place the first chamber 79 in communication with the gallery 85 whereby the full pressure of the fuel in the transfer conduit 22 is transmitted to the first chamber 79.

The spigot portion 83 of the piston 78 is drilled to provide a cylindrical bore 89 in which is slidably mounted a servo piston 90. The piston has secured thereto a rod 91 which passes upwardly out of the casing 76 and is provided at its upper end with a hook 92. The rod is guided by a screwed collar 93 received in the upper end of the bore 89. The lower side of the piston 90 is acted upon by a spring 94 and the fluid pressure in chamber 87 through a port 95 while the upper side of the piston 90 is acted on by the fluid pressure in the chamber 77 through a port 95'. A peripheral abutment 96 is provided in the bore 89 for a purpose which will hereinafter be described.

The second pump means 25 comprises a turbine 97 supplied with air from the compressor 11 through the conduit 26; the air is exhausted through a conduit 98. The turbine 97 is connected by means of a shaft 99 to a pump rotor 100 operating in a pump chamber 101 and the pump rotor draws fuel from a conduit 102 and delivers it into the conduit 28.

The check valve 29 comprises a peripheral abutment 103, a valve member 104 having a conical end, a spring 105 and a further peripheral abutment 106. The spring 105 normally urges the conical end of the valve member 104 into abutting relation with the abutment 103 and thereby blocks the conduit 28. If fuel pressure is developed in the conduit 28 above the valve 29 then the valve will open and permit fuel to flow downwardly into the fuel transfer conduit 22.

The control means 27 comprises a pivoted butterfly valve 107 operated by an arm 108. The arm 108 is connected to a rod member 109 having a hook 110 at its lower end and spring 111 embraces the rod member 109 and acts to move the valve 107 to its closed position. The hook 110 on the rod 109 co-operates with the hook 92 on the rod 91 and the two hooks 92 and 110 together consitute a lost motion device.

The operation of the pumping system is as follows. For starting the engine, the clutch 20 is, automatically engaged so that both pumps 17 and 18 are in operation. The pump 18 draws fuel from the inlet conduit 21 and passes it to the transfer conduit 22 while the pump 17 draws fuel from the inlet conduit 21 and passes it through the check valve 45 to the transfer conduit 22. The fuel passes along the transfer conduit into the bore 48 of the metering valve, through the orifice 51 into the fuel delivery conduit 24 and thence to the combustion chamber 12. When the engine has reached its idling speed, the speed-responsive switch 20a on the engine disengages the clutch 20 so that the pump 18 is the only pump in operation; fuel is prevented from passing back along the conduit 43 by means of the check valve 45.

The metering valve 23 is arranged to vary the fuel flow from the transfer conduit to the delivery conduit during changes in the ambient atmospheric pressure sensed by the aneroid capsule 59. As the aircraft ascends, the ambient atmospheric pressure will decrease, the aneroid capsule 59 will expand and will thus close the orifice 61. When the orifice 61 is closed there is no path for fluid to bleed from above the piston 49 so that the pressures on both sides of the piston will build up to equality through the restriction 50 and the piston will descend, since the area of its upper surface exposed to the pressure is greater than the corresponding area of its lower surface, to increase the pressure drop across the orifice 51. Conversely, as the aircraft descends, the aneroid capsule will contract and will cause the arm 55 to open the orifice 61 thereby permitting fuel to bleed from above the piston 49 and allowing the piston to rise and decrease the pressure drop across the orifice 51. As the piston rises it will pivot the arm 55 in a direction to close the orifice 61 and an upward motion of the piston will continue until the bleed through the orifice 61 is again equal to the bleed through the restriction 50 when the piston will come to rest in a new equilibrium position corresponding to the new altitude of the aircraft.

The sensing means 32 measures the difference in pressure between the fuel flowing along the transfer conduit 22 and the fuel flowing along the fuel delivery conduit 24. If the pressure difference increases, that is to say if the pressure in the fuel transfer conduit 22 rises relatively to the pressure in the fuel delivery conduit 24, the piston 66 will rise against the action of the spring 68 and will pivot the lever 72. Pivoting of the lever 72 will lift the valve member 75 thus opening the bleed and allowing the fluid in chamber 80 of the by-pass valve to drain through the conduit 39 into the chamber 74 of the sensing means and thence along the conduit 40 back to the fuel inlet conduit 21. As the fluid drains out of the chamber 80, the piston 78 of the by-pass valve will rise under the influence of the pressure in the chamber 79 so lifting the valve member 84 relative to the orifice 85 and permitting increased by-pass flow from the fuel transfer conduit 22, through the conduit 36, the gallery 86, the orifice 85, the chamber 87 and the conduit 37 back to the fuel inlet conduit 21.

Conversely, if the pressure drop decreases, that is to say if the pressure in the fuel delivery conduit 24 rises relatively to the pressure in the fuel transfer conduit 22, the piston 66 of the sensing means will descend and will cause the lever 72 to close the variable bleed by the valve member 75. Fluid can now no longer drain from the second chamber 80 of the by-pass valve. However, fuel passes through the restriction 82 from the conduit 36 to the conduit 39 and the pressure above the piston 78 will build up to be equal to the pressure below the piston. Since the area of the upper surface of the piston 78 is greater than the area of the lower surface of the piston, the piston will move down and will reduce the by-pass flow through the orifice 85; thus downward movement is assisted by the spring 81. If the pressure difference decreases sufficiently, the by-pass valve will descend and will completely close the orifice 85. The variable bleed and the arrangement of the piston 78 constitute actuating means for the by-pass valve 84, 85.

As the fuel demand of the engine increases from idling, the by-pass valve i.e. the orifice 85 and valve member 84, which was initially wide open will gradually close until, when the delivery conduit 24 is taking all the fuel that the pump 18 can deliver, the by-pass valve will be fully closed. The closing of the by-pass valve brings into operation the second fuel pump means consisting of the pump 25 as will now be described.

During normal operation of the system, the servo piston 90 within the spigot 83 of the by-pass valve will be kept in the position shown in FIGURE 2 by means of the difference in the fluid pressure of the fuel above the piston, which is the full pressure in the transverse conduit 22 and which acts on the piston 90 through the ports 95', and the pressure below the piston which is solely the pressure of the inlet conduit 21, due to the pressure drop across the orifice 85, and which acts through the port 95; in this position the piston 90 of the hook 92 will be above and clear of the hook 110. As the piston 78 descends to close the orifice 85, the servo piston will also descend and the hook 92 will eventually come into contact with the hook 110 and will move the rod 109 downwards to pivot the butterfly valve 107. As the valve 107 opens, compressed air enters the turbine 97 to drive it; the turbine 97 in turn drives the pump rotor 100 which draws fuel from the fuel inlet conduit 102 and delivers the fuel into the conduit 28. The fuel pressure developed in the upper part of the conduit 28 opens the check valve 29 and the fuel flows into the fuel transfer conduit 22 and augments the fuel delivered by the pump 18.

In practice, the second pump means 25 will be brought into operation gradually as the by-pass valve nears its fully closed position, i.e. the second pumping means will be brought into operation as the fuel taken by the engine increases up to a point where it is approaching the full capacity of the pump 18. Conversely, if the fuel requirement of the engine decreases, the pressure drop across the metering valve will decrease causing the piston 78 to rise to increase the by-pass flow thereby raising the rod 91 so that the hook 92 is clear of the hook 110 and allowing the valve 107 to close under the influence of the spring 111. As the valve 107 closes, the pump 25 is rendered inoperative and no further fuel is delivered into the conduit 28.

It will be appreciated that, if the engine is windmilling and no fuel is being delivered by the pump 18, it will be undesirable for the second fuel pump 25 to be brought into operation. If, therefore, there is no fuel pressure in the system and the by-pass valve piston 78 is therefore moved to its lower position by the spring 80, the servo piston 90 rises in the bore 89 until the piston co-acts with the abutment 96; the servo piston 90 is enabled to rise under the influence of the spring 94 since there is no fluid pressure acting on the upper side of the piston. Since the piston 90 has risen relatively to the piston 78, the piston 78 can assume its lowermost position without the rod 91 having been forced down sufficiently for the hook 92 to contact the hook 110 and thereby open the butterfly valve 107 to bring the second pump means into operation. In other words, movement of the servo piston 90 upwardly relatively to the piston 78 increases the lost motion of the lost motion device 92, 110.

If afterburner fuel is required, the control 31 is operated by the pilot and fuel is bled off from the fuel transfer conduit 22 and delivered through the pipe 30 to the afterburner. The turning on of the afterburner will have the effect of reducing the pressure difference across the metering valve thereby causing the by-pass valve to close and bringing the second pump means into operation to provide the extra fuel required for afterburning.

It will be seen that the invention provides a comparatively simple pumping system which may be designed to be efficient over a wide range of fuel flows. The second pump means which, in the example described as an air turbine pump, may be designed for the specific purpose and is not called upon to perform efficiently over a wide range of fuel flows.

It will be understood that the form of the invention herewith shown and described is a preferred example and that various modifications may be carried out without departing from the spirit of the invention, or the scope of the appended claims.

What I claim as my invention is:

1. A fuel pumping system for an aircraft engine including a fuel inlet conduit; a fuel transfer conduit; first pump means interposed between said conduits to draw fuel from the inlet conduit and to deliver the fuel to the transfer conduit; a fuel delivery conduit; a metering valve interposed between said transfer and delivery conduits to vary the fuel flow from the transfer conduit to the delivery conduit; sensing means connected to both the transfer conduit and the delivery conduit to measure the pressure drop across the metering valve; a variable by-pass valve connected between the transfer conduit and the inlet conduit; actuating means for the by-pass valve including a cylinder, a piston slidable in the cylinder and dividing it into first and second chambers, means transmitting the full pressure in the transfer conduit to the first chamber, means transmitting the pressure in the transfer conduit to the second chamber through a restriction, and a variable bleed to control leakage of fluid from said second chamber whereby, when the bleed is closed the piston moves to close the by-pass valve and when the bleed is open the piston moves to open the by-pass valve; an operative connection between the variable bleed and the sensing means to operate said bleed in dependence on the pressure drop across the metering valve, the sensing means operating to open the bleed as the pressure drop increases and operating to close the bleed as the pressure drop decreases; second pump means arranged to deliver fuel into the transfer conduit; control means for the second pump means; and a lost motion device between said control means and said piston, said lost motion device comprising two parts one of which is connected to said control means, a servo piston slidable in a bore in said first mentioned piston, a piston rod connected to said servo piston and forming the other part of the lost motion device, means to transmit the pressure in said first chamber to one side of said servo piston, a spring acting on the other side of said servo piston and an abutment in said bore towards which the servo piston is urged by the spring, said servo piston normally being maintained out of contact with the abutment by means of the fluid pressure acting on said one side of the servo piston but said piston being forced against the abutment by the spring when there is no fluid pressure acting on the servo piston, movement of the servo piston into contact with the abutment moving the piston rod relative to the first mentioned piston to increase the lost motion of said lost motion device thus preventing operation of said second pump means when there is no fluid pressure in said first chamber.

2. A fuel pumping system for an aircraft gas turbine engine including a fuel inlet conduit; a fuel transfer conduit; a gear pump interposed between said conduits to draw fuel from the inlet conduit and to deliver the fuel to the transfer conduit; mechanical means driving the gear pump from the engine; a fuel delivery conduit; a metering valve interposed between the transfer and delivery conduits to vary the fuel flow from the transfer conduit to the delivery conduit; sensing means connected to both the transfer conduit and the delivery conduit to measure the pressure drop across the metering valve; a variable by-pass valve connected between the transfer conduit and the inlet conduit; actuating means operatively connected to the sensing means to vary the setting of the by-pass valve in dependence on the pressure drop across the metering valve as measured by the sensing means; an air-turbine fuel pump arranged when operative to deliver fuel into the transfer conduit; pipe means to bleed air from the engine compressor to drive said air-turbine fuel pump; a control valve in the pipe means to control the air flow through the pipe means; a mechanical lost-motion device interposed between the by-pass valve and the control valve to open the latter gradually as the by-pass valve closes thus bringing the air-turbine pump into operation, the air-turbine pump being in full operation when the by-pass valve is closed; and means to increase the lost motion of said lost-motion device when there is no fuel pressure in the system thus preventing the initiation of operation of the air-turbine pump as the by-pass valve closes.

3. A fuel pumping system for an aircraft engine comprising first and second fuel pumps to feed fuel to the engine; driving means continuously driving the first pump from the engine; a variable by-pass valve associated with the first pump and operable to by-pass fuel delivered by the first pump to the inlet thereof; control means for bringing the second pump into operation; a lost-motion device interposed between the by-pass valve and the control means to operate the latter to bring the second pump into operation when the by-pass valve is closed and the first pump is delivering at its maximum capacity; and means to increase the lost motion of said device when there is no fuel pressure in the system thus preventing operation of the control means and the second pump as the by-pass valve closes.

4. A fuel pumping system for an aircraft gas turbine engine comprising a gear fuel pump to feed fuel continuously to the engine; an air-turbine fuel pump to feed fuel intermittently to the engine; driving means continuously driving the gear pump from the engine; a variable by-pass valve associated with the gear pump and operable to by-pass fuel delivered by the gear pump to the inlet thereof; pipe means to bleed air from the engine compressor to drive said air-turbine fuel pump; a control valve in the pipe means to control the air flow through the pipe means; a lost-motion device interposed between the by-pass valve and the control valve to operate the latter to bring the air-turbine pump into operation when the by-pass valve is closed and the gear pump is delivering at its maximum capacity; and means to increase the lost motion of said device when there is no fuel pressure in the system thus preventing operation of the control valve and the air-turbine pump as the by-pass valve closes.

5. A fuel pumping system for an aircraft gas turbine engine including a fuel inlet conduit; a fuel transfer conduit; a gear pump interposed between said conduits to draw fuel from the inlet conduit and to deliver the fuel continuously to the transfer conduit; mechanical means driving the pump from the engine; a fuel delivery conduit; a metering valve interposed between the transfer and delivery conduits to vary the fuel flow from the transfer conduit to the delivery conduit; sensing means connected to both the transfer conduit and the delivery conduit to measure the pressure drop across the metering valve; a variable by-pass valve connected between the transfer conduit and the inlet conduit; actuating means for the by-pass valve including a cylinder, a piston slidable in the cylinder and dividing it into first and second chambers, means transmitting the full pressure in the transfer conduit to the first chamber, means transmitting the pressure in the transfer conduit to the second chamber through a restriction, and a variable bleed to control leakage of fluid from said second chamber whereby, when the bleed is closed the piston moves to close the by-pass valve and when the bleed is open the piston moves to open the by-pass valve; an operative connection between the variable bleed and the sensing means to operate said bleed in dependence on the pressure drop across the metering valve, the sensing means operating to open the bleed as the pressure drop increases and operating to close the bleed as the pressure drop decreases; an air-turbine fuel pump arranged when operative to deliver fuel into the transfer conduit; pipe means to bleed air from the engine compressor to drive said air-turbine fuel pump; a control valve in the pipe means to control the air flow through the pipe means; and a lost-motion device between said control valve and said piston, said lost-motion device comprising two parts one of which is connected to said control valve, a servo piston slidable in a bore in said first-mentioned piston, a piston rod connected to said servo piston and forming the other part of the lost-motion device, means to transmit the pressure in said first chamber to one side of said servo piston, a spring acting on the other side of said servo piston and an abutment in said bore towards which the servo piston is urged by the spring, said servo piston normally being maintained out of contact with the abutment by means of the fluid pressure acting on said one side of the servo piston but said piston being forced against the abutment by the spring when there is no fluid pressure acting on the servo piston, movement of the servo piston into contact with the abutment moving the piston rod relative to the first-mentioned piston to increase the lost motion of said lost-motion device thus preventing opening of the control valve and operation of said air-turbine pump when there is no fluid pressure in said first chamber.

References Cited in the file of this patent

UNITED STATES PATENTS

| | | |
|---|---|---|
| 2,545,856 | Orr | Mar. 20, 1951 |
| 2,595,618 | Vogt et al. | May 6, 1952 |
| 2,636,553 | Ballantyne et al. | Apr. 28, 1953 |
| 2,725,932 | Ballantyne et al. | Dec. 6, 1955 |
| 2,780,172 | Coar | Feb. 5, 1957 |
| 2,835,323 | Booth | May 20, 1958 |
| 2,916,876 | Colley et al. | Dec. 15, 1959 |
| 2,946,190 | Corbett | July 26, 1960 |
| 2,981,271 | Cowles et al. | Apr. 25, 1961 |